United States Patent
Birau et al.

(10) Patent No.: US 7,427,324 B1
(45) Date of Patent: *Sep. 23, 2008

(54) METHODS OF MAKING QUINACRIDONE NANOSCALE PIGMENT PARTICLES

(75) Inventors: Maria M. Birau, Mississauga (CA); Rina Carlini, Oakville (CA); Karl W. Dawson, Ottawa (CA); Sandra J. Gardner, Oakville (CA); C. Geoffrey Allen, Waterdown (CA); Caroline M. Turek, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,461

(22) Filed: Nov. 1, 2007

Related U.S. Application Data

(63) Continuation-in-part of application No. 11/759,906, filed on Jun. 7, 2007.

(51) Int. Cl.
- C09B 48/00 (2006.01)
- C09B 67/20 (2006.01)
- C09B 67/52 (2006.01)

(52) U.S. Cl. .......... 106/497; 106/495; 546/49; 546/56

(58) Field of Classification Search ........ 106/495, 106/497; 546/49, 56
See application file for complete search history.

(56) References Cited

U.S. PATENT DOCUMENTS

| | | | |
|---|---|---|---|
| 3,201,402 | A | 8/1965 | Bohler et al. |
| 3,261,837 | A | 7/1966 | Bohler et al. |
| 4,830,671 | A | 5/1989 | Frihart et al. |
| 4,889,560 | A | 12/1989 | Jaeger et al. |
| 4,889,761 | A | 12/1989 | Titterington et al. |
| 5,194,638 | A | 3/1993 | Frihart et al. |
| 5,278,020 | A | 1/1994 | Grushkin et al. |
| 5,290,654 | A | 3/1994 | Sacripante et al. |
| 5,308,734 | A | 5/1994 | Sacripante et al. |
| 5,344,738 | A | 9/1994 | Kmiecik-Lawrynowicz et al. |
| 5,346,797 | A | 9/1994 | Kmiecik-Lawrynowicz et al. |
| 5,364,729 | A | 11/1994 | Kmiecik-Lawrynowicz et al. |
| 5,370,963 | A | 12/1994 | Patel et al. |
| 5,372,852 | A | 12/1994 | Titterington et al. |
| 5,403,693 | A | 4/1995 | Patel et al. |
| 5,418,108 | A | 5/1995 | Kmiecik-Lawrynowicz et al. |
| 5,597,856 | A | 1/1997 | Yu et al. |
| 5,679,138 | A | 10/1997 | Bishop et al. |
| 6,174,937 | B1 | 1/2001 | Banning et al. |
| 6,399,713 | B1 | 6/2002 | MacQueen et al. |
| 6,492,458 | B1 | 12/2002 | Pavlin et al. |
| 6,537,364 | B2 | 3/2003 | Dietz et al. |
| 6,837,918 | B2 | 1/2005 | Pozarnsky et al. |
| 6,864,371 | B2 * | 3/2005 | Babler .......... 546/49 |
| 6,902,613 | B2 | 6/2005 | Babler et al. |
| 7,211,139 | B2 * | 5/2007 | Robertson et al. ........ 106/497 |
| 2003/0065804 | A1 | 4/2003 | MacQueen et al. |
| 2003/0199608 | A1 | 10/2003 | Kamigaki et al. |
| 2005/0109240 | A1 | 5/2005 | Maeta et al. |
| 2006/0063873 | A1 | 3/2006 | Lin et al. |
| 2007/0012221 | A1 | 1/2007 | Maeta et al. |
| 2007/0120921 | A1 | 5/2007 | Carlini et al. |
| 2007/0120924 | A1 | 5/2007 | Odell et al. |

FOREIGN PATENT DOCUMENTS

| | | |
|---|---|---|
| CH | 372316 | 11/1963 |
| CH | 404034 | 6/1966 |
| GB | 2 238 792 | 6/1991 |
| JP | 2005238342 A2 | 9/2005 |
| JP | 2007023168 | 2/2007 |
| JP | 2007023169 | 2/2007 |
| WO | 2004/026967 | 4/2004 |
| WO | 2004/048482 | 6/2004 |
| WO | 2006/005521 | 1/2006 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

U.S. Appl. No. 11/759,906, filed Jun. 7, 2007.
Hideki Maeta et al., "New Synthetic Method of Organic Pigment Nano Particle by Micro Reactor System," http://aiche.confex.com/aiche/s06/preliminaryprogram/abstract_40072.htm, date unknown.
K. Balakrichnan et al., "Effect of Side-Chain Substituents on Self-Assembly of Perylene Diimide Molecules: Morphology Control," *J. Am. Chem. Soc.*, vol. 128, p. 7390-98 (2006), no month.
Kazuyuki Hayashi et al., "Uniformed nano-downsizing of organic pigments through core-shell structuring," Journal of Materials Chemistry, 17(6), 527-530 (2007), no month.

(Continued)

*Primary Examiner*—Anthony J Green
(74) *Attorney, Agent, or Firm*—Oliff & Berridge, PLC

(57) ABSTRACT

A nanoscale pigment particle composition includes a quinacridone pigment having at least one functional moiety, and a sterically bulky stabilizer compound having at least one functional group, wherein the functional moiety associates non-covalently with the functional group; and the presence of the associated stabilizer limits the extent of particle growth and aggregation, so as to afford nanoscale-sized particles of the pigment. The composition is made by providing a first solution containing a quinacridone pigment precursor or a crude quinacridone pigment, having at least one functional moiety; providing a second solution containing stabilizer molecules of a sterically bulky stabilizer compound having one or more functional groups that associate non-covalently with the functional moiety of the pigment or precursor; combining the first and second solutions to form a third mixture of precipitated quinacridone pigment particles having nanoscale particle sizes, and wherein the functional moiety of the pigment associates non-covalently with the functional group of the stabilizer compound.

29 Claims, No Drawings

OTHER PUBLICATIONS

Kento Ujiiye-Ishii et al., "Mass-Production of Pigment Nanocrystals by the Reprecipitation Method and their Encapsulation," *Molecular Crystals and Liquid Crystals*, v. 445, p. 177 (2006), no month.

W. Herbst, K. Hunger, *Industral Organic Pigments*, "Quinacridone Pigments" Wiley-VCH Third Edition, p. 452-472 (2004), no month.

F. Kehrer, "Neuere Entwicklung auf den Gebiet der Chemie organischer Pigmentfarbstoffe," Chimia, vol. 28(4), p. 173-183 (1974), no month.

B.R. Hsieh et al, "Organic Pigment Nanoparticle Thin Film Device via Lewis Acid Pigment Solubilization and In Situ Pigment Dispersions," Journal of Imaging Science and Technology, vol. 45(1), p. 37-42 (2001), no month.

* cited by examiner

US 7,427,324 B1

METHODS OF MAKING QUINACRIDONE NANOSCALE PIGMENT PARTICLES

This application is a continuation-in-part of U.S. patent application Ser. No. 11/759,906 to Maria Birau et al. filed Jun. 7, 2007, the entire disclosure of which is incorporated herein by reference.

TECHNICAL FIELD

This disclosure is generally directed to methods for producing nanoscale quinacridone pigment particles. Such particles are useful, for example, as nanoscopic colorants for such compositions as inks and the like, such as ink jet ink compositions, phase change ink compositions, and non-aqueous liquid ink compositions.

CROSS-REFERENCE TO RELATED APPLICATIONS

Disclosed in commonly assigned U.S. patent application Ser. No. 11/759,906 to Maria Birau et al. filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

The entire disclosure of the above-mentioned application is totally incorporated herein by reference.

BACKGROUND

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Pigments are a class of colorants useful in a variety of applications such as for example paints, plastics and inks, including inkjet printing inks. Dyes have typically been the colorants of choice for inkjet printing inks because they are readily soluble colorants and, more importantly, do not hinder the reliable jetting of the ink. Dyes have also offered superior and brilliant color quality with an expansive color gamut for inks, when compared with conventional pigments. However, because dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water/solventfastness). In certain situations, pigments are the better alternative as colorants for inkjet printing inks since they are insoluble and cannot be molecularly dissolved within the ink matrix, and therefore do not experience colorant diffusion. Pigments can also be significantly less expensive than dyes, and so are attractive colorants for use in all printing inks.

Key issues with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nano-sized pigment particles that minimize or avoid the problems associated with conventional larger-sized pigment particles. There further remains a need for processes for making and using such improved nano-sized pigment particles as colorant materials. The present nanosized pigment particles are useful in, for example, paints, coatings and inks (e.g., inkjet printing inks) and other compositions where pigments can be used such as plastics, optoelectronic imaging components, photographic components, and cosmetics among others. The following documents provide background information:

U.S. Pat. No. 6,902,613 discloses a mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

WO 2004/048482 discloses a mixture of an organic nanosize pigment comprising of from 50 to 99% by weight of the nanosize pigment and 1 to 50% by weight based of a low molecular weight polysulfonated hydrocarbon, in particular naphthalene mono- or disulfonic acid formaldehyde polymer, and its use as a particle growth and crystal phase director for the preparation of a direct pigmentary organic pigment or in pigment finishing.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

U.S. Pat. No. 3,201,402 discloses a process for the production of pigment dyestuffs of the quinacridone-7,14-dione series, which consists of reaction 1 more of 2,5-dihalogenoterephthalic acid and one or more of its esters either simultaneously or successively with 2 moles of an aromatic amine or of a mixture of different aromatic amines, in which at least one position ortho to the amino group is free, and converting the resulting 2,5-diarylaminoterephthalic acid or its ester into a quinacridone-7,14-dione by heating at a high temperature in an acid condensation medium, if desired in presence of an inert organic solvent.

Kento Ujiiye-Ishii et al., "Mass-Production of Pigment Nanocrystals by the Reprecipitation Method and their Encapsulation," *Molecular Crystals and Liquid Crystals*, v. 445, p. 177 (2006) describes that quinacridone nanocrystals with controlled size and morphology were readily fabricated by using a pump as an injection apparatus of the reprecipitation method for mass-production and injecting concentrated N-methyl-2-pyrrolidinone solution. The reference describes that encapsulation of quinacridone nanocrystals using polymer was achieved and quite improved dispersibility was confirmed for the encapsulated nanocrystals.

Hideki Maeta et al., "New Synthetic Method of Organic Pigment Nano Particle by Micro Reactor System," in an abstract available on the internet at http://aiche.confex.com/aiche/s06/preliminaryprogram/abstract_40072.htm, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

WO 2004026967 discloses nanoparticles manufactured by dissolving organic pigments in organic solvents containing at least 50 vol. % amides and adding the organic solvent solutions in solvents, which are poor solvents for the pigments and compatible with the organic solvents, while stirring. Thus, quinacridone pigment was dissolved in 1-methyl-2-pyrrolidinone and added to water with stirring to give a fine particle with average crystal size 20 nm.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 µm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

Other publications of interest, and the aspects of which may be selected for embodiments of the present disclosure, include:

1) W. Herbst, K. Hunger, *Industrial Organic Pigments*, "Quinacridone Pigments" Wiley-VCH Third Edition, p. 452-472 (2004);
2) F. Kehrer, "Neuere Entwicklung auf den Gebiet der Chemie organischer Pigmentfarbstoffe," Chimia, vol. 28(4), p. 173-183 (1974);
3) B. R. Hsieh et al, "Organic Pigment Nanoparticle Thin Film Devices via Lewis Acid Pigment Solubilization and In Situ Pigment Dispersions," Journal of Imaging Science and Technology, vol. 45(1), p. 37-42 (2001);
4) Swiss Patent No. 372316 to H. Bohler et al, Nov. 30, 1963; and
5) Swiss Patent No. 404034 to H. Bohler, Jun. 30, 1966

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing methods for producing nanoscale quinacridone pigment particles.

In an embodiment, the disclosure provides a process for preparing nanoscale quinacridone pigment particles, comprising:

preparing a first solution comprising: (a) a crude quinacridone pigment or pigment precursor, having at least one functional moiety and (b) a liquid medium;

preparing a second solution comprising: (a) a sterically bulky stabilizer compound having one or more functional groups that associate non-covalently with the functional moiety of the quinacridone pigment, and (b) a liquid medium;

combining the first solution into the second solution to form a third mixture and which forms a quinacridone pigment composition having nanoscale particle sizes, and wherein the functional moiety of the pigment associates non-covalently with the functional group of the stabilizer.

In another embodiment, the disclosure provides a process for preparing nanoscale quinacridone pigment particles, comprising:

preparing a first solution in an acidic liquid comprising a quinacridone pigment or pigment precursor having at least one functional moiety;

preparing a second solution comprising an organic liquid medium and a sterically bulky stabilizer compound having one or more functional groups that associate non-covalently with the functional moiety of the pigment;

combining the second solution with the first solution; and precipitating quinacridone pigment particles having nanoscale particle sizes, and wherein the functional moiety of the pigment associates non-covalently with the functional group of the stabilizer compound.

DETAILED DESCRIPTION OF EXEMPLARY EMBODIMENTS

Embodiments of the present disclosure provide nanoscale quinacridone pigment particles, and methods for producing such nanoscale quinacridone pigment particles. In embodiments, the method can be by the dissolution of crude pigment in strong acidic liquids with controlled precipitation into a mixture containing one or more sterically bulky stabilizer compounds, or by the synthesis of quinacridone pigment nanoparticles from a pigment precursor whereby one or more sterically bulky stabilizer compounds are introduced into the reaction mixture during the last synthesis step.

The term "precursor" or "pigment precursor" as used in "precursor to the organic pigment" can be any chemical substance that is an advanced intermediate in the total synthesis of a compound (such as the organic pigment). In embodiments, the organic pigment and the pigment precursor may or may not have the same functional moiety. In embodiments, the pigment precursor to the organic pigment may or may not be a colored compound. In still other embodiments, the pigment precursor and the organic pigment can have different functional moieties.

The steric stabilizer can have the potential to associate non-covalently with the pigment's and/or the pigment precursor's functional moieties via, for example, hydrogen bonding, van Der Waals forces, and aromatic pi-stacking such that a controlled crystallization of nanopigment particles occurs. That is, the steric stabilizer provides a functional group that is a complementary part to the functional moiety of the pigment and/or the pigment precursor. The term "complementary" as used in complementary functional group of the stabilizer indicates that the complementary functional group is capable of noncovalent chemical bonding such as "hydrogen bonding" with the functional moiety of the organic pigment and/or the functional moiety of the pigment precursor.

The stabilizer can be any compound that has the function of limiting the extent of pigment particle or molecular self-assembly so as to produce predominantly nanoscale-sized pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional spatial volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity (pigment or precursor), the stabilizer molecules act as surface barrier agents for the primary pigment particles and effectively encapsulates them, and thereby limits the growth of the pigment particles and affording only nanoparticles of the pigment.

The functional moiety of the organic pigment or pigment precursor can be any suitable moiety capable of non-covalent bonding with the complementary functional group of the stabilizer compound. For the quinacridone pigment, illustrative functional moieties include, but are not limited to, the following: carbonyl groups (C=O), and substituted amino groups such as for example [phenyl-NH-phenyl]. For the pigment precursor, functional moieties include but are not limited to carboxylic acid groups (COOH), ester groups (COOR, where R is any hydrocarbon), and substituted amino groups such as —NH-phenyl-$R_1$ and —NH-phenyl-$R_2$ where $R_1$, $R_2$ can be different or identical.

Representative pigment precursors include the 2,5-di-anilino-terephthalic and their corresponding ester derivatives with any hydrocarbon chain R, as indicated in Formula 1 below. The hydrocarbon chain R can represent (but is not limited to) hydrogen, a straight or branched alkyl group with 1 to about 20 carbons such as methyl, ethyl, propyl, isopropyl, butyl and the like, or cyclic alkyl groups such as cyclohexyl, or anysubstituted or unsubstituted aryl group such as phenyl, naphthyl, para-methoxybenzyl, and others. The functional moieties $R_1$ and $R_2$ can be present at any position on the aniline aromatic ring such as ortho, meta or para; they can be different or identical with each other and include the following functional groups: H, alkyl group with 1 to about 20 carbons such as methyl, ethyl, alkoxyl group with 1 to about 20 carbons such as methoxyl, ethoxyl, aryloxyl such as phenoxyl, and arylalkoxyl such as benzyloxyl and any halide such as Cl, Br

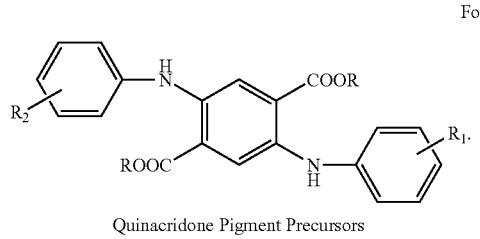

Formula 1

Quinacridone Pigment Precursors

In specific embodiments, compounds of formula 1 include the following:

—R=H or any hydrocarbon chain, $R_1=R_2=H$;

—R=H or any hydrocarbon chain, $R_1=H$, $R_2$=halide such as Cl or Br;

—R=H or any hydrocarbon chain, $R_1=R_2=CH_3$, $CH_2CH_3$, $CH_2CH_2CH_3$, $CH(CH_3)_2$;

—R=H or any hydrocarbon chain, $R_1=H$, $R_2=CH_3$, $CH_2CH_3$, $CH_2CH_2CH_3$, $CH(CH_3)_2$;

—R=H or any hydrocarbon chain, $R_1=CH_3$, $CH_2CH_3$, $CH_2CH_2CH_3$, $CH(CH_3)_2$, $R_2$=halide such as Cl or Br;

—R=H or any hydrocarbon chain, $R_1=R_2$=halide such as Cl or Br;

—R=H or any hydrocarbon chain, $R_1=C_1$, $R_2=Br$;

R=H or any hydrocarbon chain, $R_1=R_2=O-CH_3$, $O-CH_2CH_3$, $O-CH_2CH_2CH_3$, $O-CH(CH_3)_2$, $O-(CH_2)C_6H_5$;

—R=H or any hydrocarbon chain, $R_1=H$, $R_2=OCH_3$, $O-CH_2CH_3$, $O-CH_2CH_2CH_3$, $O-CH(CH_3)_2$, $O-(CH_2)C_6H_5$; and R=H or any hydrocarbon chain, $R_1=OCH_3$, $O-CH_2CH_3$, $O-CH_2CH_2CH_3$, $O-CH(CH_3)_2$, $O-(CH_2)C_6H_5$, $R_2$=halide such as Cl or Br.

The complementary functional group of the stabilizer can be any suitable group that is capable of non-covalent bonding with the functional moiety of the pigment or precursor. Examples of stabilizer compounds that contain a complementary functional groups include, but are not limited to, the following classes: beta-amino carboxylic acids, their salts and their esters or amides containing large mono or polycyclic aromatic moieties such as phenyl, benzyl, naphthyl and the like, linear or branched aliphatic chains having from about 5 to about 30 carbons such as pentyl, hexyl, heptyl, octyl, nonyl, decyl, undecyl and the like; beta-hydroxy carboxylic acids, their esters or amides containing linear, cyclic or branched aliphatic chains such as having from about 5 to about 30 carbons such as pentyl, hexyl, cyclohexyl, heptyl, octyl, nonyl, decyl, undecyl, and the like; sorbitol esters prepared from long-chain aliphatic carboxylic acids having at least 12 carbons, such as lauric acid, oleic acid, palmitic acid, stearic acid, iso-stearic acid, and the like; homopolymers of alkyl (meth)acrylates such as for example poly(methyl methacrylate), polyvinylpyrrolidone (or PVP), copolymers of PVP with olefins, such as PVP-graft-(1-hexadecene) and PVP-graft-(1-triacontene), copolymers of PVP with (meth) acrylates, such as poly(1-vinylpyrrolidone-co-acrylic acid).

[Representative stabilizers to enable the formation of nano-sized particles of quinacridone pigments include, but are not limited to, the following: mono-esters, di-esters and tri-esters of sorbitol prepared from palmitic acid (commercially available as SPAN® 40), stearic acid (commercially available as SPAN® 60) and oleic acid (commercially available as SPAN® 85) where the alkyl group attached to the carboxyl portion of the ester is considered sufficiently sterically bulky; oleic acid, iso-stearic acid, lauric acid, tetradecanoic acid, pentadecanoic acid, abietic acid, tartaric acid and esters thereof, with branched aliphatic alcohols that are either mono-, di- or tri-functional alcohols, such as for example cyclohexanol, 2-ethylhexanol, glycerol, penta-erythritol, and 2-octyl-1-dodecanol also known commercially as Isofol 20 (available from Jarchem, Newark, N.J.) where such the aliphatic groups in these examples are considered sufficiently sterically bulky.

The sterically bulky group of the stabilizer can be any suitable group that limits the extent of particle self-assembly to nanosized particles. It is understood that "sterically bulky group" is a relative term requiring comparison with the size of the precursor/pigment; a particular group may or may not be "sterically bulky" depending on the relative size between the particular group and the precursor/pigment. In embodiments, the phrase "sterically bulky" refers to the spatial arrangement of a large group attached to a molecule. For example, for various quinacridone pigments such as Pigment Red 122, Pigment Red 202, and Pigment Violet 19, the functional groups found with the sorbitol ester stabilizers, such as commercially available SPAN® 40 and SPAN® 85 esters, all have long linear aliphatic groups on the carboxyl portion of the stabilizers, which are considered to have adequate "steric bulk" so as to enable the stabilizer to limit the extent of pigment self-assembly or aggregation and mainly produce pigment nano-sized particles.

In additional embodiments, other stabilizer compounds having different structures than those described previously may be used in addition to sterically bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such hydrocarbon alcohols, acrylic-based polymers such as poly(acrylic acid), poly(methyl methacrylate), styrene-based copolymers such as poly(styrene sodio-sulfonate) and poly(styrene)-co-poly(alkyl(meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The non-covalent chemical bonding between the functional moiety of the precursor/pigment and the complementary functional group of the stabilizer is for example afforded by van der Waals' forces, ionic bonding, hydrogen bonding, and/or aromatic pi-stacking bonding. In embodiments, the non-covalent bonding is ionic bonding and/or hydrogen bonding but excluding aromatic pi-stacking bonding. In other embodiments, the non-covalent bonding can be predominantly hydrogen bonding or can be predominantly aromatic pi-stacking bonding, where the term "predominantly" indicates in this case the dominant nature of association of the stabilizer with the pigment particle.

The "average" particle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size can be measured by methods that use light scattering technology to infer particle size, such as Dynamic Light Scattering. The term "particle diameter" as used herein refers to the length of the pigment particle as derived from images of the particles generated by Transmission Electron Microscopy. The term "nanosized" (or "nanoscale: or "nanoscale sized") such as used in "nano-sized pigment particles" refers to, for instance, an average particle size, $D_{50}$, of less than about 150 nm, such as about 1 nm to about 100 nm, or about 10 nm to about 80 nm. Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln\mu_g)^2}{n}}$$

Commercial pigments, having typical median particle sizes of at least about 100 nm to about 1 micron, have both varied particle size distributions and particle aspect ratios. The aspect ratio of a particle relates its length dimension to its width dimension. Generally, the aspect ratio of a particle increases with its length dimension and, frequently, produces acicular and/or irregular morphologies that can include ellipsoids, rods, platelets, needles, and the like. Typically, organic pigments such as for example quinacridone pigments, have large particle size distribution as well as large distribution of particle aspect ratios and potentially, a large distribution of particle morphologies. This scenario is undesirable, as it can lead to non-dispersed, phase-segregated inks or dispersions and the like made from such pigments having a large distribution of particle size and/or aspect ratio.

Quinacridone nanopigments, when properly synthesized using exemplary conditions and stabilizers outlined herein the embodiments, will have a more regular distribution of particle sizes and particle aspect ratio (length:width), the latter being about less than 4:1 with the median particle size being less than about 100 nm, as determined using a dynamic light scattering technique such as with a particle size analyzer.

An advantage of the processes and compositions of the disclosure is that they provide the ability to tune particle size and composition for the intended end use application of the quinacridone pigment. For example, the color of the nano-sized pigment particles have the same general hue as is found with larger pigment particles. However, in embodiments, is disclosed coloristic properties of thin coatings onto Clear Mylar® film prepared with nano-sized pigment particles of quinacridone pigments dispersed in a polymer binder such as poly(styrene-b-4-vinylpyridine In embodiments is disclosed the coloristic properties (hue angle, L*, a*, b*, and C*) of nano-sized quinacridone pigments, as well as their average pigment particle sizes, measured by either Dynamic Light Scattering or electron microscopy imaging techniques. In embodiments, it is known that as both the particle size and particle size distribution of pigment particles decreases, the more transparent the particles become. Preferably, this leads to an overall higher color purity of the pigment particles when they are dispersed onto various media via from being coated, sprayed, jetted, extruded, etc.

There are several known methods for the total synthesis of quinacridone pigments, which consist of chemical transformations to form the pentacyclic ring system by either the thermally-induced ring closure or the acid-catalyzed ring closure as described by W. Herbst and K. Hunger in *Industrial Organic Pigments*, chapter "Quinacridone Pigments" Wiley-VCH Third Edition, p. 452-472 (2004). The pentacyclic ring system of quinacridones can be approached by the latter acid-catalyzed ring closure reaction on a 2,5-dianilino terephthalic acid or ester pigment precursor, as illustrated in Formula (1) and in FIG. (1), which in turn is prepared from one of two known starting materials: a) succinate esters, and b) 2,5-dihalo-terephthalic acid.

FIG. 1: Synthetic Routes to Making Quinacridone Pigments.

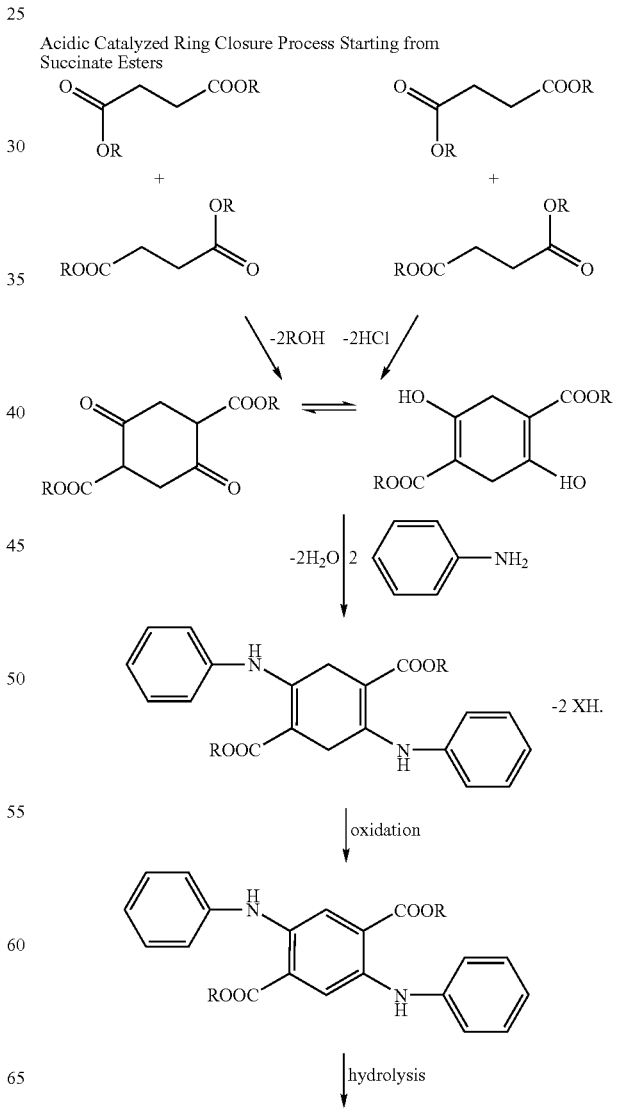

-continued

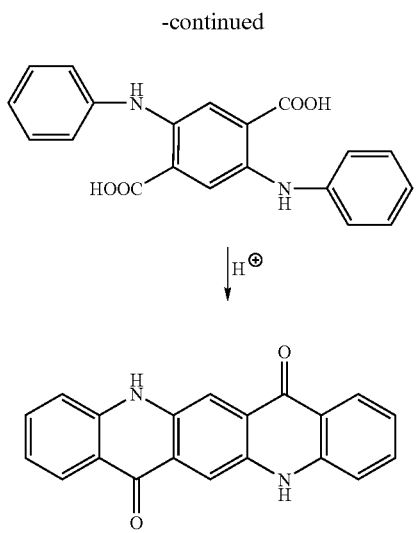

R = any hydrocarbon

Acidic Catalyzed Ring Closure Process Starting from 2,5-Dihaloterephthalic Acid

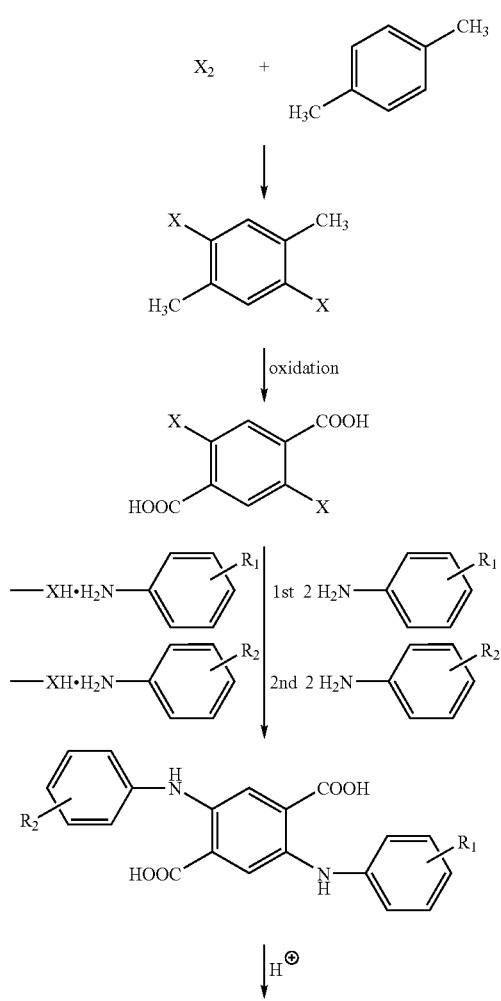

-continued

X = Cl, Br
$R_1$, $R_2$ = H, X, $CH_3$, $OCH_3$

In embodiments, nano-sized particles of quinacridone pigment can be prepared in one of two ways: 1) solubilizing crude quinacridone pigment into an acidic liquid (commonly known as "acid pasting") and reprecipitation of the pigment as nanoparticles under certain conditions; and 2) synthesis of nano-sized particles of quinacridone pigment by acid-catalyzed ring closure of an advanced pigment precursor.

In embodiments, for the acid dissolution of the pigment any suitable agent can be used to completely solubilize the pigment subjecting the solution to conditions which re-precipitate the solubilized pigment into nano-sized particles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof.

Any suitable liquid medium can be used to carry out the re-precipitation of the quinacridone pigment so as to afford nano-sized particles. Examples of suitable liquid media include, but are not limited to, the following organic liquids such as: N-methyl-2-pyrrolidinone, dimethyl sulfoxide, and N,N-dimethylformamide, N,N-dimethylacetamide, sulfolane, hexamethylphosphoramide, among others.

Any liquid that will not dissolve the pigment can be used as an optional precipitating agent. Preferable precipitating agents include, but are not limited to, alcohols such as methanol, ethanol, 1-propanol, 2-propanol, 1-butanol, 2-butanol; water, tetrahydrofuran, ethyl acetate, hydrocarbon solvents such as hexanes, toluene, xylenes, Isopar solvents, and mixtures thereof.

The steric stabilizer loading in the reaction can vary between about 5 to about 300 mol %, such as about 10 to about 150 mol %, or about 20 to about 70 mol % to pigment. Optionally, the solids concentration of the nanopigment in the final precipitated mixture can be vary from 0.5% to 20% by weight such as from 0.5% to about 10% by weight, or 0.5% to about 5% by weight, but the actual value can also be outside these ranges.

In the method 1), the crude quinacridone pigment is first solubilized in an acidic liquid, such as for example, concentrated sulfuric acid, which is then added slowly under vigorous agitation to a second solution comprising a suitable solvent and a steric stabilizer compound, and optionally a minor amount of a surface-active agent or other common additive. During the addition, the temperature is maintained anywhere from about 0° C. to about 60° C., although the re-precipitation of quinacridone pigment to form nanoparticles can be held isothermally within or outside this temperature range, in one embodiment and, in another embodiment, the temperature during re-precipitation of quinacridone pigment to form nanoparticles can also be allowed to cycle up and down within or outside this temperature range.

In this method, a first solution is prepared or provided that comprises pigment particles dissolved or dispersed in a strong acid. The strong acid can be, for example, a mineral acid, an organic acid, or a mixture thereof. Examples of strong mineral acids include sulfuric acid, nitric acid, perchloric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like This first solution can include the strong acid in any desirable amount or concentration, such as to allow for desired dissolution or dispersion of the pigment particles. The acid solution contains pigment in a concentration of 0.5% to 20%, preferably 1% to 15% and most preferably 2% to 10% by weight, although the values can also be outside these ranges.

In this method, the second solution is prepared or provided that comprises the steric stabilizer. Suitable steric stabilizers include those described earlier, and can include others such as the surface-active agents described previously which have functional groups that also interact with the functional moieties of the pigment particles to provide additional stabilization. The steric stabilizer can be introduced in the form of a solution, where the steric stabilizer is either dissolved or finely suspended in a suitable liquid medium, such as water or polar organic solvents such as acetone, acetonitrile, ethyl acetate, alcohols such as methanol, ethanol, isopropanol, diethyl ether, tetrahydrofuran, N-methyl-2-pyrrolidinone, dimethyl sulfoxide, N,N-dimethylformamide, mixtures thereof, and the like. For example, one suitable liquid medium in an embodiment is a mixture of water and N-methyl-2-pyrrolidinone. Such mixtures can contain water and N-methyl-pyrrolidinone in a ratio of 1:6 to 1:3, and preferably around 1:4.

If desired, a precipitating agent, such as those described above, can also be incorporated into the second solution. Precipitating agents are liquids that do not solubilize the pigment and include, but are not limited to, water, alcohols such as methanol, ethanol and isopropanol and various mixtures thereof. The precipitating agent can be added in a range of 10% to 100% by volume out of the total volume of the mixture, preferably between 20% and 80%, and most preferably between 30% and 70%.

The re-precipitation of the pigment to form nano-sized particles can be conducted by adding the first (dissolved pigment) solution to the second (steric stabilizer) solution. In embodiments, this addition is conducted slowly by adding the first (dissolved pigment) solution to the second (steric stabilizer) solution under vigorous agitation by use of high-speed mechanical stirring or homogenization or other means.

In this method 1), the re-precipitation process can be conducted at any desired temperature to allow for formation of quinacridone nanoparticles while maintaining solubility of the first and second solutions. For example, the re-precipitation can be conducted at a temperature of from about 0° to about 90° C., such as from about 0° to about 60° C., or from about 0° to about 30° C., although temperatures outside of these ranges can be used, if desired. In one embodiment, the re-precipitation can be performed essentially isothermally, where a substantially constant temperature is maintained, while in another embodiment, the temperature during re-precipitation can be allowed to fluctuate within a desired range, where the fluctuation can be cyclic or the like.

After addition of the first solution (dissolved pigment) to the second solution, it is expected that a non-covalent bonding interaction occurs between the functional moieties present on the pigment molecules and the functional groups of the steric stabilizer molecules, which creates a steric barrier that limits or prevents further aggregation of the pigment molecules. In this way, the pigment particle size and morphology, can be controlled and even tailored by providing steric stabilizer compositions and process conditions that limit pigment particle growth to a desired level.

Once the re-precipitation is complete, the pigment nanoparticles can be separated from the solution by any conventional means, such as for example, vacuum-filtration methods or centrifugal separation methods. The nanoparticles can also be processed for subsequent use according to known methods.

A second method of making nano-sized particles of quinacridone pigment involves acid-catalyzed ring closure of a quinacridone pigment precursor. In this second method 2), the pigment is synthesized concurrently with nanoparticle formation. That is, pigment molecules are prepared from precursor compounds according to known chemical synthesis processes, except that within a key step that involved acid-catalyzed ring closure to form the quinacridone pentacyclic ring system, at least one steric stabilizer compound is introduced. The steric stabilizer can be used for any synthetic route that utilizes the acid-catalyzed ring closure step to form the desired quinacridone structure.

Various processes for synthesizing quinacridone pigments are well known in the art. For example, U.S. Pat. Nos. 2,821,529 and 2,821,541 each describe a six-step process for making quinacridone pigments by constructing the middle aromatic ring first. A newer approach, described by Von F. Kehrer, *Chimia*, vol. 26, p. 173 (1974), is a three-step process beginning from an aromatic starting material. The entire disclosures of these references are incorporated herein by reference. For example, various pigment precursors of formula (1) above can be produced from aromatic starting materials, and then subsequently these pigment precursors are subjected to an acid-catalyzed ring closure reaction. If this reaction is performed in the presence of certain sterically bulky stabilizer compounds, the desired quinacridone pigment nanoparticles are formed.

For example, one embodiment of the second method discloses the synthesis of quinacridone pigment nanoparticles starting from a halogenated aromatic raw material, as outlined in FIG. (1). A key intermediate is the pigment precursor, 2,5-dianilino terephthalic acid or its diester derivative, as illustrated in Formula (1). An acid-catalyzed cyclization is performed on this pigment precursor in the presence of a sterically bulky stabilizer compound. In this particular method, the acid-catalyzed cyclization can be conducted in any suitable acidic liquid medium, such as, for example, in the presence of any of the strong acids as described previously for the first method of making quinacridone pigment nanoparticles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof.

Likewise, the steric stabilizer can be added as a solution directly into the reaction mixture. The steric stabilizer solution can be added, for example, dropwise or otherwise at a slow rate of addition. In other embodiments, the steric stabilizer solution can be added to the acid solution containing solubilized quinacridone pigment or pigment precursor. In yet other embodiments, the solution containing a steric stabilizer can be proportionately and concurrently mixed with a solution of dissolved quinacridone pigment or pigment precursor over time in a suitable apparatus.

The steric stabilizer loading in the reaction can vary between about 5 to about 300 mol %, such as about 10 to about 150 mol %, or about 20 to about 70 mol % to pigment. Optionally, the solids concentration of the nanopigment in the final precipitated mixture can be vary from 0.5% to 20% by weight such as from 0.5% to about 10% by weight, or 0.5% to about 5% by weight, but the actual value can also be outside these ranges.

During the acid-catalyzed cyclization reaction, the presence of the added steric stabilizer compound causes non-covalent bonding interactions to occur between the functional moiety of the formed pigment molecules and the functional group of the steric stabilizer molecules. It is expected that this non-bonding interaction creates a steric barrier surrounding the pigment molecules. That is, the steric stabilizer molecules form a barrier that limits or prevents uncontrolled aggregation of the pigment molecules that would normally lead to large pigment aggregates. In this way, the pigment particle size and morphology, can be controlled and even tailored by providing steric stabilizer compositions and process conditions that limit pigment particle growth to a desired level.

Once the re-precipitation is complete, the pigment nanoparticles can be separated from the solution by any conventional means, such as for example, vacuum-filtration methods or centrifugal separation methods. The nanoparticles can also be processed for subsequent use according to known methods.

Each of the methods allows for narrow control of the pigment particle size and morphology, and particle size and morphology distribution. For example, these methods allow for controlling the pigment particle size to be of nanoscale size, having an average particle size of less than about 150 nm, such as ranging from about 10 nm to about 100 nm, or about 10 nm to about 80 nm, and with a narrow particle size distribution (GSD), such as about 1.1 to about 1.8, such as about 1.2 to about 1.7, or about 1.3 to about 1.5. Likewise, the formed nanopigments can have a narrow aspect ratio range of, for example, less than about 4:1 (length:width).

The formed nanoscale quinacridone pigment particles can be used, for example, as colorants in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including solid inks with melt temperatures of about 60 to about 140° C., solvent-based liquid inks or radiation and UV-curable liquid inks comprised of alkyloxylated monomers, and even aqueous inks.

The invention will now be described in detail with respect to specific exemplary embodiments thereof, it being understood that these examples are intended to be illustrative only and the invention is not intended to be limited to the materials, conditions, or process parameters recited herein. All percentages and parts are by weight unless otherwise indicated.

EXAMPLES

Example 1

Preparation of Nano-Sized Particles of Pigment Red 202 (Method 1)

Commercially available Pigment Red 202 (obtained from Bayer, Germany) (1.5 g, 0.004 mol) was dissolved with stirring in 20 mL concentrated sulfuric acid. The solution of dissolved pigment was slowly added while stirring over a period of 60 minutes into a solution containing sorbitan monopalmitate (SPAN 40® obtained from Aldrich, Milwaukee, Wis., 4.0 g, 0.01 mol) dissolved in 100 mL N-methyl-2-pyrrolidinone. The temperature of the reaction mixture was maintained below 35° C. during the addition. The color of the reaction mixture changed to a light bluish by the end of the addition. The mixture became a suspension of fine particles, which was allowed to stir for another 30 minutes, after which time was filtered using vacuum filtration. The solid was rinsed three times with dimethyl formamide and once with a mixture of 1:1 dimethyl formamide deionized water. The recovered filtercake was freeze dried to afford 1 gram of quinacridone pigment. Transmission Electron Microscopy (TEM) imaging revealed particles having a regular oval shape that ranged in particle diameter between about 25 to about 80 nm, and having regular morphology of ellipsoid or platelet shaped particles.

Example 2a

Preparation of Nano-Sized Particles of Pigment Red 122 (Method 1)

Commercially available Pigment Red 122 (obtained from Dainichiseika, Japan) (1.5 g, 0.0044 mol) was dissolved with stirring in 20 mL concentrated sulfuric acid. The solution of dissolved pigment was slowly added while stirring over a period of 60 minutes into a solution containing sorbitan trioleate (SPAN 85® obtained from Aldrich, Milwaukee, Wis., 2.95 g, 0.003 mol) in 100 mL N-methyl-2-pyrrolidinone. The temperature of the reaction mixture was maintained below 35° C. during the addition. The color of the reaction mixture changed to light bluish red by the end of the addition. The mixture became a suspension of fine particles, which was allowed to stir for another 30 minutes. Isopropanol (50 mL) was added dropwise to the suspension, after which particles were recovered by vacuum filtration. The solid was rinsed three times with dimethyl formamide and once with a mixture of 1:1 dimethyl formamide deionized water. The recovered filtercake was freeze dried to afford 1 gram of quinacridone pigment solids. Transmission Electron Microscopy revealed particles having particle diameter ranging from 25 to about 120 nm, and regular morphology of platelets shaped particles. Dynamic Light Scattering analysis measured an average particle size (D50)=89±1.2 nm, GSD=1.5±0.02.

Example 2b

Preparation of Nano-Sized Particles of Pigment Red 122 (Method 1)

Commercially available Pigment Red 122 (obtained from Dainichiseika, Japan) (1.5 g, 0.0044 mol) was stirred first in N-methylpyrrolidinone, followed by stirring in tetrahydrofuran to remove pigment additives or impurities. The NMR spectroscopic analysis of the resulting washed pigment particles revealed that no additives were remaining with the pigment. The cleaned pigment (1.5 g, 0.0044 mol) was dissolved with stirring into 20 mL concentrated sulfuric acid. The solution of dissolved pigment was slowly added while over a period of 60 minutes stirring to a solution containing sorbitan trioleate (SPAN 85® obtained from Aldrich, Milwaukee, Wis., 8.74 g, 0.009 mol) dissolved in 50 mL N-methyl-2-pyrrolidinone. The temperature of the reaction mixture was maintained below 35° C. during the addition. The color of the reaction mixture changed to light bluish red by the end of the addition. The mixture became a suspension of fine particles, which was allowed to stir for another 30 minutes. Isopropanol (50 mL) was added dropwise to the suspension, after which particles were recovered by vacuum filtration. The solid was rinsed three times with dimethyl formamide and once with a mixture of 1:1 dimethyl formamide deionized water. The recovered filtercake was freeze dried to afford 1 gram of quinacridone pigment solids. Transmission Electron Microscopy revealed particles having particle diameter ranging from 25 to about 120 nm, and regular morphology of platelets shaped particles. Dynamic Light Scattering analysis measured an average particle size (D50)=89±1.2 nm, GSD=1.5±0.02.

Example 3

Synthesis of Nano-Sized Particles of Pigment Red 122 Starting from 2,5-dichloro-para-xylene (Method 2)

a) Synthesis of 2,5-dichloro terephthalic acid: In a 250 mL round bottom flask was charged 5 g (0.028 mol) 2,5-dichloro-p-xylene, 26 g (0.165 mol) potassium permanganate, 80 mL pyridine and 20 mL deionized water. The mixture was heated to 100° C. with stirring for 12 hours. The brown manganese oxide was filtered off while the suspension was still hot, and the brown solid reslurried twice with 100 mL deionized water. The liquids were combined and the solvents removed in vacuum. The viscous yellow oil obtained was acidified with hydrochloric acid to a pH of 1. The white solid was vacuum filtered and oven-dried at 50° C. under vacuum for 24 hours, to afford 5.84 g or 87% white solid.

Synthesis of the quinacridone pigment precursor 2,5-di-(p-toluidino)-terephthalic acid: In a 3 neck round bottom flask fitted with Argon inlet and magnetic stirring was charged; p-toluidine 23.19 g (0.216 mol), 2,5-dichloro-terephthalic acid 3.6 g (0.014 mol), anhydrous potassium carbonate 4.6 g (0.033 mol), anhydrous copper (II) acetate 0.060 g (0.00033 mol), potassium iodide 0.750 g (0.0045 mol), ethylene glycol 16.8 g (0.271 mol) and deionized water 3.8 g (0.211 mol). The mixture was heated to 130° C. for 12 hours under inert atmosphere (argon). The reaction mixture was then cooled to room temperature and diluted with 50 mL deionized water. Hydrochloric acid was added with stirring to a final pH of 1. The resultant crude dark solids were filtered under vacuum. The crude solids were then dissolved into a solution of containing ammonium hydroxide (3 mL) and deionized water (250 mL) to give a yellowish-green liquid, and the undissolved material was removed by filtration. The liquid was re-acidified with acetic acid up to a pH of 3, after which a dark brown solid compound was formed. The solids were vacuum-filtered and then oven-dried under vacuum at 100° C. overnight, to afford 1.66 g or 31% yield, of a dark brown powder.

c) Synthesis of the nano-sized particles of pigment Red 122: In a 250 mL round bottom flask fitted with a magnetic stirring bar was charged: 15 g polyphosphoric acid, 1 g of 2,5,di-(-toluidino)-terephthalic acid from Example 3, step b). The mixture was heated at 160° C. for two hours. A dark red-violet color appeared. The reaction mixture was cooled to room temperature and then diluted with 80 mL concentrated sulfuric acid. The resultant solution was transferred into a dropping funnel. The violet solution was added dropwise with stirring to a vessel containing 100 mL N-methyl-2-pyrrolidinone and 1.96 g (0.002 mol) of SPAN 85® (obtained from Aldrich, Milwaukee, Wis.). During the addition, the temperature was maintained below 45° C. When the addition finished, the mixture was stirred at room temperature for 30 minutes and vacuum-filtered. The resulting solid particles were reslurried into 300 mL isopropanol, vacuum-filtered and then reslurried into 300 mL deionized water. After filtration the pigment solids were freeze dried for 48 hours to give a red-violet powder, 0.450 g or 50% yield. The particle morphology and range in size observed by Transmission Electron Microscopy imaging revealed a distribution of regularly shaped particles that were ellipsoids and platelets, and the distribution of particle diameters ranged from about 30 nm to about 100 nm. Dynamic Light Scattering analysis measured an average particle size (D50) of 100±1.4 nm and GSD of 1.71±0.02.

Comparative Example

Pigment Dispersion 1: Preparation of Liquid Dispersions Containing Larger-Sized Particles of Quinacridone Pigment A dispersion of the commercial pigment red 202 (obtained from Bayer, Germany) was dispersed in the following manner: 0.062 g Poly(styrene-b-4-vinylpyridine) (prepared at Xerox Corp., USA) and 6.97 g toluene (analytical reagent grade from Calcdon Laboratories) were added to a 30 mL bottle. To this mixture were added 70.0 g of ⅛ inch diameter 440C Grade 25 steel balls (available from Hoover Precision Products, Inc), and lastly, 0.14 g of the commercial starting pigment material used in Example 1 (obtained from Bayer). The bottle was placed on a jar mill at a rotating speed of about 7 cm/s for 4 days. The resultant dispersion had low viscosity and good wettability characteristics and was well-dispersed.

Comparative Example

Pigment Dispersion 2: Preparation of Liquid Dispersions Containing Larger-Sized Particles of Quinacridone Pigment A liquid dispersion was prepared in the same manner as in Comparative Example 1, except using the commercial Pigment Red 122 that was used as the starting material for Example 2 (obtained from Dainichiseika, Japan). The resultant dispersion had low viscosity and good wettability characteristics and was well-dispersed.

Example 4

Preparation of Liquid Dispersions Using Nano-Sized Pigment Particles

A liquid dispersion was prepared in the same manner as in Comparative Example 1, except using the nano-sized quinacridone pigment particles from Example 1. The resultant dispersion had low viscosity and excellent wettability characteristics and was well-dispersed.

Example 5

Preparation of Liquid Dispersions Using Nano-Sized Pigment Particles

A liquid dispersion was prepared in the same manner as in Comparative Example 1, except using the nano-sized quinacridone pigment particles from Example 2a. The resultant dispersion had low viscosity and excellent wettability characteristics and was well-dispersed.

Example 6

Preparation of Liquid Dispersions Using Nano-Sized Pigment Particles

A liquid dispersion was prepared in the same manner as in Comparative Example 1, except using the nano-sized quinacridone pigment particles from Example 3. The resultant dispersion had low viscosity and good wettability characteristics and was well-dispersed.

Example 7

Preparation of Liquid Dispersions Using Nano-Sized Pigment Particles

A liquid dispersion was prepared in the same manner as in Comparative Example 1, except using the nano-sized quinacridone pigment particles from Example 2b. The resultant dispersion had low viscosity and good wettability characteristics and was well-dispersed.

Example 8

Coloristic Data for Coatings Made from Liquid Dispersions of Quinacridone Pigments The following data in Table 1 shows the relative coloristic data obtained from 8-path coatings produced on Clear Mylar® film from liquid dispersions based in toluene, as prepared in Comparative Examples 2 and 3 and Examples 4-7. An X-RITE 938 spectro-densitometer was used to assess the coloristic properties. The data below were normalized to magenta optical density of 1.5.

TABLE 1

Comparison of Coloristic Properties of Pigment Red122 Coatings on clear Mylar film, cast from toluene-based Liquid Dispersion (Magenta O.D. = 1.5)

| Property | Comp. Example 1 | Comp. Example 2 | Example 4 | Example 5 | Example 6 | Example 7 |
|---|---|---|---|---|---|---|
| L* | 53.43 | 51.69 | 54.09 | 51.44 | 51.80 | 53.97 |
| a* | 79.08 | 77.70 | 80.92 | 78.92 | 78.79 | 80.21 |
| b* | −33.90 | −33.13 | −36.12 | −36.60 | −38.70 | −36.49 |
| Hue Angle (deg) | 336.8 | 336.7 | 336.0 | 335.1 | 333.8 | 335.5 |
| C* | 86.1 | 84.6 | 88.6 | 87.0 | 87.8 | 88.1 |

The data in Table 1 shows the enhancement of chroma value (C*) of the coatings made with nanopigments (Examples 4-7) compared with coatings prepared with the larger-sized, commercial pigment (Comparative Example, Pigment Dispersion). Enhanced chroma was realized with synthesized PR122 described in Example 3.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing nanoscale quinacridone pigment particles, comprising:
    providing a first solution comprising a quinacridone pigment precursor or crude quinacridone pigment having at least one functional moiety;
    providing a second solution comprising a sterically bulky stabilizer compound having at least one functional group that associates non-covalently with the functional moiety on the pigment or pigment precursor;
    combining the first solution and the second solution to form a third solution
    which forms a quinacridone pigment composition having nanoscale particle size and wherein the functional moiety on the pigment associates non-covalently with the functional group of the stabilizer.

2. The process of claim 1, wherein the presence of the associated stabilizer limits the extent of particle growth and aggregation, so as to afford nanoscale-sized particles of the pigment.

3. The process of claim 1, wherein the pigment or precursor have at least one functional moiety to interact with the at least one functional group of the stabilizer.

4. The process of claim 1, wherein the nanoscale quinacridone pigment particles have an average particle diameter of less than about 150 nm as derived from Transmission Electron Microscopy.

5. The process of claim 1, wherein the nanoscale quinacridone pigment particles are formed from a quinacridone precursor selected from the group consisting of compounds of the following Formula 1, and esters and amides thereof:

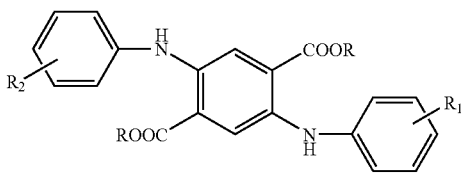

wherein R represents hydrogen, a linear, branched or cyclic alkyl group having from 1 to about 20 carbon atoms, or substituted or unsubstituted aryl groups, $R_1$ and $R_2$ each independently represents H, alkyl, alkoxyl, and aryloxyl groups, and halogen atoms.

6. The process of claim 1, wherein the nanoscale quinacridone pigment particles are formed from a quinacridone precursor selected from the group consisting of compounds of the following Formula (1):

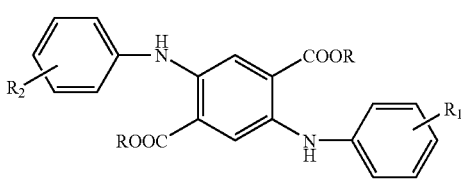

wherein R represents hydrogen, a linear, branched or cyclic alkyl group having from 1 to about 20 carbon atoms, or substituted or unsubstituted aryl groups; $R_1$ and $R_2$ each independently represents H, alkyl, alkoxyl, and aryloxyl groups, and halogen atoms.

7. The process of claim 6, wherein the nanoscale quinacridone pigment particles are formed from a quinacridone precursor selected from the group consisting of:
 a) compound of the formula (1) wherein $R_1=R_2=H$;
 b) compound of the formula (1) wherein $R_1=H$, $R_2=$halide;
 c) compound of the formula (1) wherein $R_1=R_2=CH_3$, $CH_2CH_3$, $CH_2CH_2CH_3$, $CH(CH_3)_2$;
 d) compound of the formula (1) wherein $R_1=H$, $R_2=CH_3$, $CH_2CH_3$, $CH_2CH_2CH_3$, $CH(CH_3)_2$;
 e) compound of the formula (1) wherein $R_1=CH_3$, $CH_2CH_3$, $CH_2CH_2CH_3$, $CH(CH_3)_2$; $R_2=$halide;
 f) compound of the formula (1) wherein $R_1=R_2=$halide;
 g) compound of the formula (1) wherein $R_1=C_1$, $R_2=Br$;
 h) compound of the formula (1) wherein $R_1=R_2=OCH_3$, $O-CH_2CH_3$, $O-CH_2CH_2CH_3$, $O-CH(CH_3)_2$, $O-(CH_2)C_6H_5$;
 i) compound of the formula (1) wherein $R_1=H$, $R_2=OCH_3$, $O-CH_2CH_3$, $O-CH_2CH_2CH_3$, $O-CH(CH_3)_2$, $O-(CH_2)C_6H_5$ and
 j) compound of the formula (1) wherein $R_1=OCH_3$, $O-CH_2CH_3$, $O-CH_2CH_2CH_3$, $O-CH(CH_3)_2$, $O-(CH_2)C_6H_5$, $R_2=$halide.

8. The process of claim 1, wherein the at least one functional group of the sterically bulky stabilizer is selected from the group consisting of beta-amino carboxylic acids and their salts, esters or amides; beta-hydroxy carboxylic acids and their salts, esters, or amides; sorbitols and their esters or amides; glycerols and their esters or amides; and penta-erythritols and their esters or amides.

9. The process of claim 1, wherein the sterically bulky stabilizer is selected from the group consisting of: mono-, di-, and tri-esters and mono-, di-, and tri-amides of sorbitols, glycerol, or pentaerythritols prepared with linear, branched or cyclic carboxylic acids having at least 12 carbons.

10. The process of claim 1, wherein the sterically bulky stabilizer is selected from the group consisting of abietic acid derivatives.

11. The process of claim 1, wherein the sterically bulky stabilizer is selected from the group consisting of tartaric acid derivatives.

12. The process of claim 1, wherein at least one of the second solution and the third solution further comprises a surface active agent.

13. The process of claim 1, wherein the quinacridone pigment or the pigment precursor and the sterically bulky stabilizer compound are non-covalently associated by at least one of van der Waals' forces, ionic bonding, coordination bonding, hydrogen bonding, and aromatic pi-stacking bonding.

14. The process of claim 1, wherein the quinacridone pigment particles have an average aspect ratio (length:width) of less than or equal to 4:1.

15. The process of claim 1, wherein:
 the first solution comprises crude quinacridone pigment having at least one functional moiety in an acidic liquid;
 the second solution comprises an organic solvent medium and the stabilizer compound having one or more functional groups that associate non-covalently with the functional moiety of the pigment; and
 combining the first solution with the second solution to form a third solution;
 and precipitating quinacridone pigment particles having a nanoscale particle size, wherein the functional moiety of the pigment associates non-covalently with the functional group of the stabilizer compound.

16. The process of claim 15, wherein the acidic liquid is selected from the group consisting of mineral acids and organic acids.

17. The process of claim 15, wherein the acidic liquid is selected from the group consisting of sulfuric acid, nitric acid, perchloric acid, hydrohalic acids, fluorosulfonic acid, chlorosulfonic acid, phosphoric acid and polyphosphoric acid, boric acid, organo-sulfonic acids, arenesulfonic acids, acetic acid, haloacetic, dihaloacetic, trihaloacetic acids, cyanoacetic acid, and mixtures thereof.

18. The process of claim 15, further comprising adding a precipitating agent to at least one of the second and third solutions.

19. The process of claim 15, wherein the precipitating is conducted at a temperature of from about 0 to about 90° C.

20. The process of claim 1, wherein:
 the first solution comprises (a) a quinacridone pigment precursor having at least one functional moiety and (b) a liquid medium;
 the second solution comprises (a) the sterically bulky stabilizer compound having at least one functional group that associate non-covalently with the functional moiety of the pigment, and (b) a liquid medium; and
 combining the first solution with the second solution to form a third solution,
 and precipitating quinacridone pigment particles having a nanoscale particle size, wherein the functional moiety of the pigment associates non-covalently with the functional group of the stabilizer compound.

21. The process of claim 20, wherein the liquid medium of the first solution comprises a mineral acid or an organic acid with an optional second liquid.

22. The process of claim 20, wherein the liquid medium of the second solution comprises an organic solvent and optionally an organic co-solvent or water.

23. The process of claim 20, wherein the combining of the first and second solutions is conducted at a temperature between 0° C. and 50° C.

24. The process of claim 20, wherein the sterically bulky stabilizer compound is present in an amount of from about 1 to about 300 mol % to quinacridone pigment.

25. The process of claim 20, wherein a concentration of the quinacridone pigment composition present in the third mixture is from about 0.5% to about 20% by weight.

26. The process of claim 20, wherein the combining of the first and second solutions further comprises a chemical transformation to form said quinacridone pigment molecules from said quinacridone pigment precursor.

27. The process of claim 10, wherein the sterically bulky stabilizer is selected from the group consisting of abietic acid, abietic acid esters, abietic acid amides, abietic acid salts, dehydroabietic acid, dehydroabietic acid esters, dehydroabietic acid amides, dehydroabietic acid salts, pimaric acid, pimaric acid esters, pimaric acid amides, pimaric acid salts, hydrogenated abietic acid, hydrogenated abietic acid esters, hydrogenated abietic acid amides, and hydrogenated abietic acid salts, wherein when the sterically bulky stabilizer is an ester or amide, the ester or amide is prepared from sorbitol, glycerol, pentaerythritol or alkanols containing from 1 to 10 carbons.

28. The process of claim 11, wherein the sterically bulky stabilizer is a mono- or di-ester or amide of tartaric acid, prepared with linear, branched or cyclic alcohols or amines.

29. The process of claim 26, wherein the chemical transformation comprises an intramolecular ring-closing step.

* * * * *